United States Patent [19]

Smith et al.

[11] 4,374,014
[45] Feb. 15, 1983

[54] HIGH PRESSURE ELECTROLYTIC OXYGEN GENERATOR

[75] Inventors: Robert E. Smith; Donald R. Gormley, both of Annapolis, Md.

[73] Assignee: The United States of America as represented by the Secretary of the Navy, Washington, D.C.

[21] Appl. No.: 245,819

[22] Filed: Mar. 20, 1981

[51] Int. Cl.³ .................. C25B 9/04; C25B 11/03; C25B 13/06

[52] U.S. Cl. .................. 204/260; 204/266; 204/283; 204/288; 204/289

[58] Field of Search .................. 204/263–266, 204/260, 272, 283–284, 295, 129, 288, 289, 274

[56] References Cited

U.S. PATENT DOCUMENTS

| | | | |
|---|---|---|---|
| 2,468,357 | 4/1949 | Brown | 204/272 X |
| 3,379,634 | 4/1968 | Rutkowski | 204/266 X |
| 3,481,857 | 12/1969 | Gray | 204/272 X |
| 3,933,614 | 1/1976 | Bunn, Jr. | 204/260 X |
| 3,984,303 | 10/1976 | Peters et al. | 204/260 |
| 4,029,565 | 6/1977 | Bender et al. | 204/266 X |
| 4,276,147 | 6/1981 | Epner et al. | 204/272 |

Primary Examiner—Donald R. Valentine
Attorney, Agent, or Firm—R. F. Beers; L. A. Marsh

[57] ABSTRACT

An electrolytic gas generator comprises a housing, an end cap sealing the housing and electrically insulated therefrom, an electrode assembly supported within the housing, and contact elements for transferring electrical current from the housing and the end cap to the electrode assembly. The electrode assembly includes a concentric arrangement of an inner cathode structure, an intermediate asbestos separator, and an outer anode element.

10 Claims, 5 Drawing Figures

HIGH PRESSURE ELECTROLYTIC OXYGEN GENERATOR

BACKGROUND OF THE INVENTION

This invention generally relates to electrolytic oxygen generators and more particularly to oxygen generators designed for use aboard submarines.

Electrolytic gas generators commonly include an electrolytic pressure vessel; an electrode assembly supported within the pressure vessel; and an appropriate electrolyte disposed within the pressure vessel for providing electrolytic contact between the anode and cathode elements. A membrane means is provided between the cathode and anode elements so that when a voltage difference is applied between the electrodes, the gasses produced at different electrodes are precluded from mixing. Examples of electrolytic gas generators are generally set forth in U.S. Pat. Nos. 2,928,783; 3,305,458; 3,382,167; 3,933,614; 4,042,481; and 4,113,601.

One type of oxygen generator currently being used aboard submarines is the Treadwell electrolytic generator. The individual cells of the Treadwell generator essentially comprise a wire-basket cathode wrapped with two layers of asbestos cloth and sealed within an outer metallic pressure vessel which serves as the anode. An asbestos membrane is positioned between the anode and the cathode to separate the oxygen and hydrogen gasses produced at the respective electrodes. However, severe operating conditions occurring within the electrolytic cells have been found to cause rapid decay and degradation of the asbestos membrane and the electrode screens, thereby resulting in the inefficient production of oxygen and hydrogen gasses.

SUMMARY OF THE INVENTION

The present invention overcomes drawbacks experienced with some of the prior art by providing an electrolytic oxygen-hydrogen generator which has high efficiency anode-cathode surface areas; small inter-electrode spacing; and a low inter-electrode ionic resistance that results in lower operating temperatures and higher efficiencies than is presently available. This is accomplished by designing an electrolytic generator which comprises a cylindrical housing, top and bottom end caps which seal the end portions of the housing, an electrode assembly supported within the housing, and an electrolyte solution filling a substantial portion of the housing.

The electrode assembly consists of a concentric arrangement including a cathode screen structure, an asbestos membrane circumferentially enclosing the cathode structure, an anode structure which overlies the asbestos membrane, and means for transferring electrical current between the housing and the anode structure. The cathode screen structure includes an inner support screen which functions as a means for supporting the electrode assembly and as a means for uniformly transferring electrical currents to the overlying cathode screen which has smaller screen openings to provide a larger reaction surface. The asbestos membrane is wrapped around the cathode screen to continguously engage the underlying screen. The anode screen encloses the asbestos separator so that the anode-cathode spacing is uniformly small. The means for transferring electrical current between the anode and the housing comprises a current collector element having a central band which circumferentially engages the anode screen and a plurality of radially extending resilient finger portions for resiliently contacting the housing, wherein the finger portions include distal flange portions which are configured to engage the interior surface of the housing.

Accordingly, an object of the present invention is to provide an efficient electrolytic gas generator which operates at relatively low temperatures to reduce rapid cell structure degredation experienced with many gas generators.

Another object of this invention is the provision of anode-cathode electrode structure of reduced uniform electrode spacing to uniformly produce gasses about the electrodes with a low inter-electrode ionic resistance occurring therebetween.

A further object of the present invention is to provide a means for uniformly distributing electrical currents to the reaction surfaces of the electrodes to optimize production oxygen and hydrogen gas at a predetermined voltage.

Yet another object of this invention is to provide a means for efficiently dissipating heat generated about and anode-cathode electrodes to thereby reduce cell degradation caused by overheating of the electrodes and the asbestos membrane positioned therebetween.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings, in which:

DETAILED DESCRIPTION OF THE INVENTION

Figure 1:
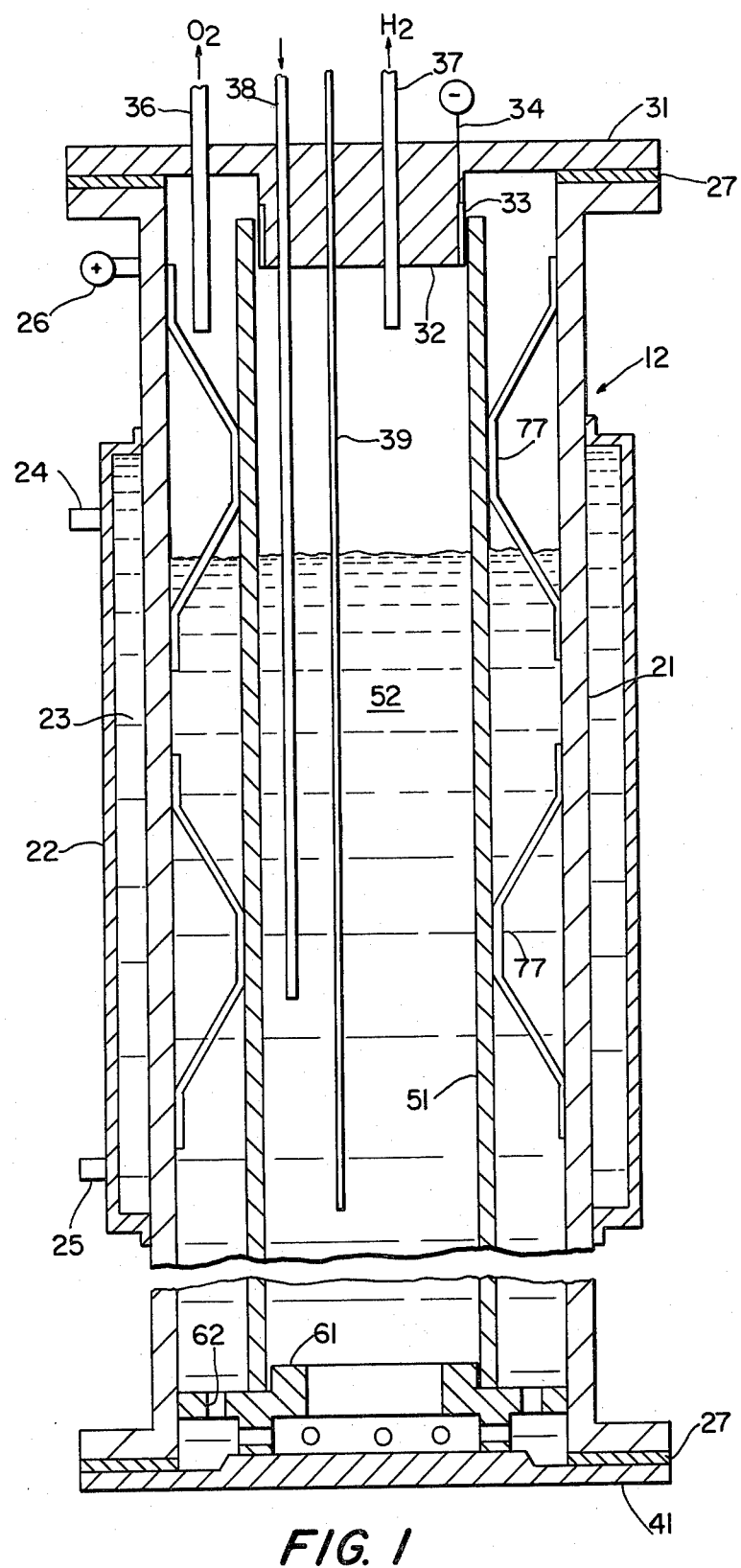
FIG. 1 is sectional view of the gas generator of the present invention.

Referring now to the drawings and to FIG. 1 in particular there is shown a sectional view of the electrolytic oxygen generator 12 of the present invention. The oxygen generator 12 essentially includes a cylindrical housing 21; top and bottom end caps 31, 41 which respectfully seal the end portions of the housing 21; an electrode assembly 51 supported within the housing 21; and an electrolyte 52 filling a substantial portion of the housing 21.

The housing 21, which constitutes part of the anode contact structure of the generator 12, is of suitable thickness to withstand operating pressures within the housing 21 of several thousand pounds per square inch (p.s.i.). For example, an 8 inch outside diameter Nickel alloy housing 21 is preferably formed with a wall thickness of one-half to five-eights inches. A cooling water jacket 22 encloses the housing 21 as shown in FIG. 1, to lower the operating temperatures within the housing 21.

Cooling water is fed into the cooling chamber 23 formed between the cooling jacket 22 and the housing 21 through inlet tube 24 and removed from the cooling chamber through outlet tube 25. An electrical contact means in the form of a positive (+) terminal element 26 is secured to the upper region of the housing 21, as shown in FIG. 1, so that the housing 21 functions as an anode (+) element of the generator 12.

Figure 3:
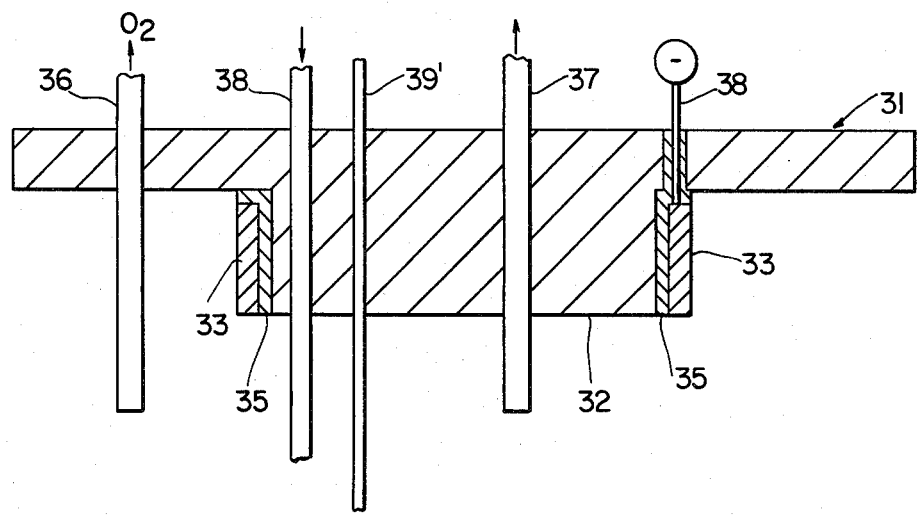
FIG. 3 is a sectional view of the top end cap structure of the present invention.

End caps 31, 41 are secured to the housing 21 with bolts and the like so that the operating pressures within the housing 21 are capable of reaching several thousand pounds per square inch (psi.). Electrical insulation gaskets 27 are provided between the anodic housing 21 and the end cap 31, 41, as shown in FIG. 1. The upper end cap 31 is provided with a circular protrusion 32 designed to serve as a means for maintaining the upper portion of the electrode assembly 51 in spaced relationship with the upper portion of the housing 21. The protrusion 32 extends into the upper portion of the circular electrode assembly 51 such that a ring-shaped electrical contact means 33 joined to the protrusion 32 contiguously engages the upper surface of the electrode assembly 51. The contact ring 33 and the lead wire 34 secured thereto are insulated from the upper end cap 31 with an appropriate insulation material 35, as shown in FIG. 3. Upper end cap 31 also includes conduit means for conveying oxygen and hydrogen gasses from the interior of the housing 21. The oxygen conduit 36 is formed in the peripheral portion of upper end cap 31 to remove oxygen gas formed on the anode (+) regions of the electrode assembly 51 and the hydrogen conduit 37 extends through a central portions of upper end cap 31 to remove hydrogen gas formed on the cathode (−) regions of the electrode assembly 51. A fluid inlet tube 38 also extends through the central portion of the upper end cap 31 for replacing water and other fluids removed during the electrolysis process. Means for determining the fluid level in the interior of the housing 21 comprises an elongated liquid level sensor 39 suspended from a central portion of the upper end cap 51. The liquid level sensor 39 is coupled to the fluid inlet tube 38 so that when the fluid level in the housing 21 drops below a predetermined level, water is automatically supplied via inlet tube 38.

The electrode assembly 51, which is centrally supported within the housing 21 essentially comprises a central cathode (−) portion 55, an asbestos membrane 65 wrapped around the cathode structure 55, an anode (+) portion 75 circumferentially enclosing the asbestos membrane 65, and electrical contact means for transferring current between the housing 21 and the anode portion 75 of the electrode assembly 51.

The cathode portion 55 of the electrode assembly 51 includes a central tubular support element 56, a metallic cathode screen 57 wrapped around the support element 56, and a metallic cathode mesh 58 contiguously secured to the underlying cathode screen 57. The tubular support element 56, which can be formed for example of a nickel plated perforated tube of a 4×4 expanded metal screen of nickel plated copper having approximately four openings per linear inch, is designed to serve as a support element 56 for the electrode assembly 51 and to uniformly distribute the applied electrical current to the overlying screen structures. For example, the support element 56 may consist of a lower screen section that is integrally bonded to an upper perforated tubular section, wherein the holes in the sections are dimensioned to permit the free flow of fluids and gas bubbles therethrough. The metallic cathode screen 57 which overlies the support element 56 provides a firm foundation for the overlying metallic mesh 58 and serves as a means for uniformly transferring the applied electrical current from the support element 56 to the wire mesh 58, thereby avoiding hot spots and inefficient production of oxygen and hydrogen. Because of the large difference between the sizes of the openings in the support element 56 and the wire mesh 58, the intermediate wire screen 57 is provided to prevent localized dishing of the wire mesh 58 into the openings in the support element 56 and to maintain the wire mesh 58 in a symmetrically cylindrical configuration. For example, in an electrode assembly 51 constructed in accordance with the present invention, the support element 56 was formed from a 4×4 mesh nickel-plated copper screen, the intermediate wire screen 57 was formed of a 30×30 expanded nickel screen (ie. 30 holes per inch in each direction), and the wire mesh 58 was formed from a 50×50 mesh nickel screen (i.e 50 holes per inch in each direction). The rate of production of oxygen and hydrogen gas is affected by the spacing between the cathode wire mesh 58 and the anode wire mesh 76 overlying the asbestos membrane 65, and by maintaining the screen elements 58, 76 at a uniform circumferential spacing or interelectrode distance a substantial portion of surface area of the screens is available for the production of oxygen and hydrogen gasses. Because the surface area provided by the wire screen 58 is larger than the surface area of the wire screen 57 and because the wire mesh cathode 58 is positioned closer to the wire mesh anode 76 than the wire screen cathode 57, the wire mesh cathode 58 serves as the primary reaction site for the production of hydrogen gas. In the abovementioned example it was found that efficient production of hydrogen gas occurred with a wire mesh size of between about 40 to about 60 openings per lineal inch with the mesh wires having a diameter of between about 0.005 to about 0.009 inches. For the abovementioned range of wire diameters, it was also determined that as the mesh size exceeds 60 openings per lineal inch occlusion occurs with the bubbles of hydrogen gas adhering to the wire mesh and clogging the mesh openings. As a result, the surface voltage required to generate the same amount of hydrogen gas as compared with the required voltage at 60 openings per inch will increase as the number of openings per inch exceeds 60 openings per inch. It was further observed that as the mesh size decreases below 40 openings per inch there was a corresponding decrease in the amount of hydrogen generated at a particular voltage. The asbestos separator 65, which contiguously overlies the wire mesh cathode 58, must provide a low resistance path for the hydroxyl ions; allow the counter diffusion of water molecules from the anolyte to the catholyte solution; and prevent the mixing of hydrogen and oxygen gasses. In addition to being a highly porous membrane with a high bubble pressure (ie. small capillary pores) the asbestos membrane 65 must also be compatible with highly caustic solutions at operating temperatures of several hundred degrees Fahrenheit. It was also observed that as the thickness of the asbestos layer 65 is increased the cell heating is increased probably as a result of increased flow resistance and polarization. Above operating temperatures of 250° F. the asbestos membranes 65 have been observed to undergo rapid deterioration and it was found that a 2½ wrap asbestos membrane having a thickness range of from about 50 to about 100 mils adequately satisfied the abovementioned design criteria.

The anode structure 75 of the electrode assembly 51 includes a wire mesh anode 76, which contiguously envelops the asbestos membrane 65, and an electrical contact means in the form of a plurality of spaced current collectors 77 which extend between the anodic housing 21 and the wire mesh anode 76. Like the wire mesh cathode 58, the wire mesh anode 76 is preferably formed of a nickel mesh having a mesh size of between about 40 to about 60 openings per lineal inch with a mesh wire diameter of between about 0.005 to about 0.009 inches. The wire mesh anode 76 is securely wrapped around the asbestos membrane 65 so that the asbestos membrane 65 and the underlying wire mesh cathode 58 are supported in a fixed position in the electrode assembly 51. By shifting the anode electrochemical reaction sites from the housing walls 21 to the wire mesh anode 76 the inter-electrode distance and the gas production efficiency is increased with lower operating temperatures.

Figure 2:
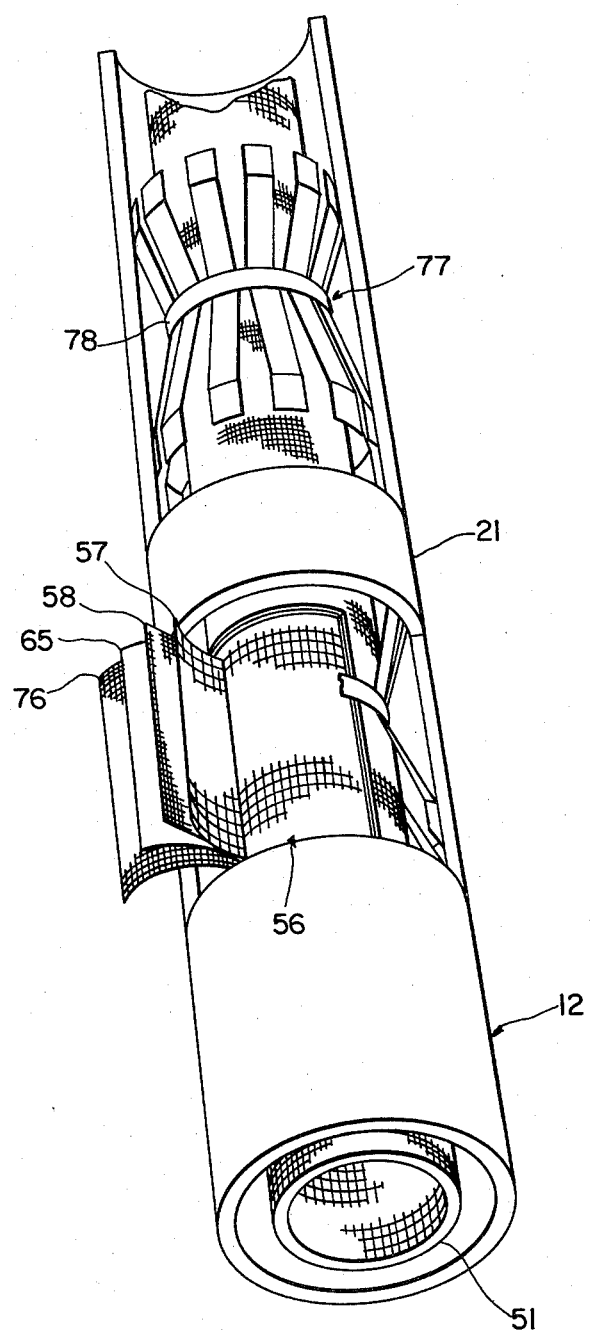
FIG. 2 is a perspective view partially broken away of the gas generator of the present invention.
Figure 4:
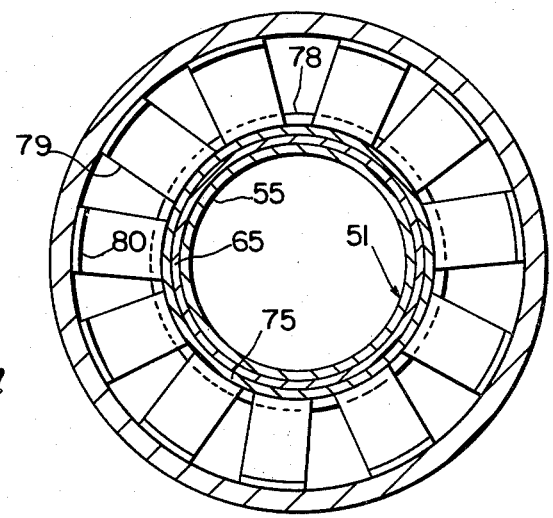
FIG. 4 is a cross-sectional view of a gas generator.
Figure 5:
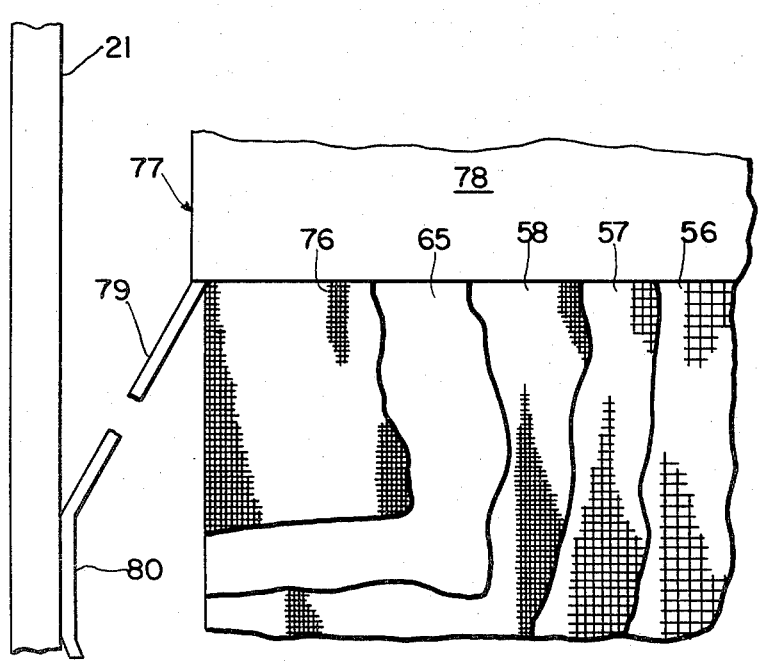
FIG. 5 is a broken away pictorial view of a portion of a gas generator.

The radially extending nickel current collectors 77 not only function to carry electrical current between the housing 21 and the wire mesh anode 76 but also provide an efficient means for dissipating heat build-up in the wire mesh 76 by distributing the excess heat to the anolyte solution and the housing walls 21. The current collectors 77, which are preferably fabricated of thin nickel or nickel alloy sheets include a central band 78 portion that circumferentially engages the underlying wire mesh anode 76 and a plurality of integral resilient finger portions 79 which extend outwardly from the central band portion 78 to resiliently engage the interior surface of the housing 21. Each finger portion 79 includes a distal flange portion 80 which is designed to contiguously engage the interior surface of the housing 21. The remote ends of the flange portions 80 are provided with a slight curvature to facilitate the insertion of the electrode assembly into the housing 21, as shown in FIG. 1 and 2. The flange portions 80 are also provided with a transverse curvature as shown in FIG. 4 that approximates the curvature of the interior of the housing 21 so that a uniform electrical contact is maintained therewith to avoid developing "hot spots". An insulated spacer element 61 is disposed between the lower portion of electrode assembly 51 and housing 21. The spacer element 61 is provided with a plurality of passageways 62 to allow the flow of electrolyte between the anodic and cathodic regions of housing 21.

Obviously many modifications and variations of the present invention are possible in light of the above teachings. For example, housing 21 may be formed with an integral lower end portion to eliminate the use of lower end cap 41. Also, the screens may be formed of such diverse materials as monel, nickel alloys of copper and silicon, and platinum. It is therefore to be understood that within the scope of the appended claims the invention may be practiced otherwise than as specifically described.

What is claimed is:

1. An electrolytic gas generator comprising:
a housing;
an electrode assembly supported within the housing, said electrode assembly including anode and cathode elements separated by an asbestos separator; and
means for transferring electrical currents between said housing and said electrode assembly, wherein said means for transferring electrical currents include a ring portion circumferentially engaging said electrode assembly, radially extending finger portions extending from said ring portion, and flange portions connected to said finger portions for contiguously engaging the inner surface of said housing.

2. The generator according to claim 1, wherein the inner surface of said housing is arcuate shaped and the flange portions are arcuately shaped to contiguously engage said inner surface of said housing.

3. An electrolytic gas generator comprises:
a housing;
an end cap sealing said housing and electrically insulated therefrom;
an electrode assembly supported within said housing, said electrode assembly including a concentric arrangement of an inner cathode structure, an intermediate asbestos separator for preventing the mixing of gases produced at different regions of the generator, and an outer anode element; and
means for transferring electrical current from said housing and said end cap to said electrode assembly wherein said means for transferring electrical currents include a ring portion circumferentially engaging said electrode assembly, radially extending finger portions from said ring portion, and flange portions connected to said finger portions for contiguously engaging the inner surface of said housing.

4. The generator according to claim 3, wherein said means for transferring electrical current between said end cap and said electrode assembly includes an electrical cathode contact formed in said end cap that engages an end portion of said cathode structure.

5. The generator according to claim 4, wherein said cathode structure includes a concentric arrangement of an inner cathode support screen connected to said electrical cathode contact and an outer cathode reaction screen that serves as the primary cathode reaction surface.

6. The generator according to claim 5, wherein said cathode reaction screen has a mesh size of between about 40 to about 60 openings per linear inch with a mesh wire diameter of between about 0.005 to about 0.009 inches.

7. The generator according to claim 3, wherein said cathode structure includes a reaction screen having a mesh size of between about 40 to about 60 openings per linear inch.

8. The generator according to claim 3, wherein said outer anode element comprises a metal screen having a mesh size of between about 40 to about 60 openings perlinear inch and a mesh wire diameter of between about 0.005 to about 0.009 inches.

9. An electrolytic gas generator comprises:
a housing;
an end cap sealing said housing and electrically insulated therefrom;
an electrode assembly supported within said housing, said electrode assembly including a concentric arrangement of an inner cathode structure, an intermediate asbestos separator for preventing the mixing of gases produced at different regions of the generator, and an outer anode element;
means for transferring electrical current from said housing and said end cap to said electrode assembly; and means for spacing said electrode assembly from said housing, said spacing means including a porous spacer element positioned between the lower portion of said electrode assembly and said housing.

10. A cell assembly for use in a submarine oxygen generator comprising:
a housing;
an end cap for sealing one end of said housing and being electrically isolated therefrom;
an electrode assembly electrically connected to said end cap and to said housing, said electrode assembly including a cathode assembly, a membrane separator, and an anode electrode;
said cathode assembly inluding an inner tubular member and a cathode electrode, said inner tubular member providing structural support for said cathode electrode and a low resistance electrical path between said end cap and the surface of said cathode electrode, said surface providing reaction sites for electrochemical reaction;
said membrane separator overlaying said cathode electrode to prevent mixing of gases produced at said anode electrode and said cathode assembly and allowing ionic transport;
said anode electrode overlaying said membrane separator to provide reaction sites for electrochemical reaction and electrically conductive paths;
means for transferring electrical current from said housing to said anode electrode including current collector ring circumferentially engaging said anode electrode, radially extending finger portions connected to said current collector ring, and flange portions connected to said finger portions to continuously engage the inner surface of said housing.

* * * * *